3,203,775
INORGANICALLY BONDED ABRASIVE
ARTICLES
John Cantrell, Sale, England, assignor, by mesne assignments, to The Carborundum Company, Niagara Falls, N.Y., a corporation of Delaware
No Drawing. Filed Nov. 21, 1961, Ser. No. 154,042
Claims priority, application Great Britain, Nov. 30, 1960, 41,110/60
2 Claims. (Cl. 51—307)

This invention relates to inorganically bonded abrasive articles, and more particularly to a hot-pressed, inorganically bonded abrasive article, such as a grinding wheel, and having a porous structure.

An object of the invention is to provide a diamond abrasive product which in addition to good life exhibits greater freedom of cut than previously proposed products, even under conditions where the grinding mechanism does not produce an adequate dressing action. The need to increase this property of freedom of cut has led to the discovery that the progressive reduction in cutting rate of many metal bonded diamond abrasives is due to the "smearing" of the bond surface in such a way as to interfere with the cutting properties of the diamond grit. It is therefore considered desirable to interrupt the continuity of the metal bond and this may be done to some degree by using a metal-ceramic bond as described in United States Patent No. 2,782,110.

In circumstances where even greater freedom of cut is demanded it has been discovered that this may be achieved by the incorporation of pores within the inorganic bond, which may be metal, metal-ceramic, or ceramic. To obtain the maximum benefit from such a porous structure it is essential to control the size, distribution and quantity of such pores.

According to the present invention there is provided an abrasive article comprising non-metallic granular abrasive material bonded together by a bond formed by fusing a metal powder or mixture of metal powders incorporating a pore-forming material comprising a water-soluble crystalline refractory salt.

According to another aspect of this invention there is provided an abrasive article comprising non-metallic granular abrasive material bonded by either a metal-ceramic or wholly ceramic bond incorporating a pore-forming material comprising a water-soluble crystalline refractory salt.

By refractory salt is meant a salt which will not melt below 750° C.

In manufacturing articles according to the invention, the granular material may be diamond grain, which grain may be present in amounts from 2 to 150 carats/cu. in. of abrasive layer. The inorganic bond may be metal, metal-ceramic, or ceramic characterized in that the bond may be hot-pressed at a temperature below the melting point of the pore-forming material. The pore-forming material is sieved to the size of pore required and added to the bond in proportions up to 80% by volume. This material must have the following properties:

(1) Availability in approximately 46 to 220 grit crystalline form.
(2) Melting point in excess of the bond pressing temperature.
(3) No reaction with bond or abrasive material at hot-pressing temperature.
(4) Not deliquescent.
(5) Solubility in aqueous grinding coolant.

A further desirable property is the ability to protect machine parts after dissolving in the grinding coolant. It is thus preferred to use a pore-forming material which, in aqueous solution, has rust inhibiting properties.

One such material is sodium pyrophosphate which has been successfully used in practising this invention.

Th inorganic bonded abrasive product above described may be fashioned into the required finished form by means of hot-pressing in a suitable mold.

It is a simple matter to obtain porosity with a cold-pressed and sintered inorganic bonded diamond wheel but cold-pressed and sintered bonds are relatively weak and increased porosity would weaken them still further. One of the advantages of this invention is that the benefits of controlled porosity are added to the characteristics of consistency, high strength and superior diamond grain retention which are inherent in inorganic bonded diamond abrasive grinding wheels made by the hot-pressing process.

Another advantage of this invention is that with a high porosity inorganic bonded diamond abrasive layer the pores form a continuous network and the pore-forming material may be leached out prior to use. Thus the benefits of porosity can be obtained in dry grinding operations or in operations where a non-aqueous coolant is used. To generate porosity by progressively dissolving the pore-forming material in the coolant during the actual grinding operation it is necessary to employ an aqueous coolant.

Another advantage of this invention is that whether formed in advance or during use, the pores act as coolant carriers so that the coolant is more effective. Furthermore, the presence of the pores results in an interrupted wheel surface which helps to inhibit smear of the grinding wheel by the work being ground.

Another advantage of this invention is that a greater depth of diamond abrasive layer may be used without increasing the total diamond carat content or cost of the wheel. This results in longer wheel life.

The reason for this is that the optimum carat content of the diamond abrasive layer for any given application has a certain diamond/bond ratio and this same diamond/bond ratio and same diamond carat content will occupy a greater volume as a porous diamond abrasive layer than as a non-porous layer.

A further advantage of this invention is that greater freedom of cut may be obtained by maintaniing the same carat content and depth of diamond abrasive layer as in the conventional non-porous wheel. This will automatically mean that part of the bond is replaced by pores and the diamond-bond ratio will thus be greater without any increase in the cost of the wheel.

An embodiment of the invention will now be described by way of the following examples.

*Example 1*

| Formula: | Percent by weight |
|---|---|
| Copper powder | 80 |
| Tin powder | 20 |
| | 100 |

A mixture of metal powder, according to the above formula, having been previously passed through a B.S.S. 200 mesh sieve is ball-milled for one hour. To this mixture is then added an equal amount by volume of the pore-forming material sodium pyrophosphate of grit size −46 +72 B.S.S. together with an amount by weight of 150 grit diamond, said amount being determined by the requirements of the application. The whole is then intimately mixed by shaking in a bottle for two minutes after which the mixture is loaded into a suitable steel mold and hot-pressed at a temperature of 650° C. and a pressure of 10,000 p.s.i. for two minutes. The abrasive article so formed is removed from the mold and after cooling is placed in running warm water to remove the surface sodium pyrophosphate crystals, then dried. It is then ready for use.

*Example 2*

5" diameter diamond abrasive grinding wheels were made using a finer than 200 mesh (B.S. sieve) powdered metal bond composition of:

| Formula: | Percent by weight |
|---|---|
| Silver powder | 10 |
| Tin powder | 20 |
| Copper powder | 70 |

These wheels were made with no porosity, 10% porosity and 20% porosity. All formulation and processing details were the same as in Example 1 except for addition of −72 +100 B.S.S. granules of sodium pyrophosphate. The diamond abrasive was 80 grit (−72 +85 B.S.S.).

Grinding tests carried out on tungsten carbide under standardized conditions showed an improvement in freedom of cut and life in the case of both the 10% and the 20% porosity wheels over the standard wheel as exemplified in the following table. 0.020" thickness of metal was removed per pass.

| Diamond Abrasive Layer | Rate of Cut, inches/sec. | Wheel loss per pass Abrasive Layer Thickness, inches |
|---|---|---|
| Solid | .017 | 0.0020 |
| 10% porosity | .112 | 0.00065 |
| 20% porosity | .132 | 0.00083 |

While the above examples illustrate metallic bonds, it will be apparent that metal-ceramic bonds, such as those described in United States Patent No. 2,782,110, as well as wholly ceramic bonds, are equally applicable in practicing the present invention, which contemplates the use of any suitable inorganic bond capable of being hot-pressed below the melting point of the refractory pore-forming material.

I claim:

1. A hot pressed abrasive article consisting essentially of diamond granular abrasive material bonded together by a fused metallic powder bonding mixture containing by weight about 80% of copper and about 20% of tin, said bonding material incorporating about an equal amount by volume of pore-forming material consisting essentially of sodium pyrophosphate.

2. A hot pressed abrasive grinding wheel consisting essentially of diamond granular abrasive material bonded together by a fused metallic bonding mixture containing by weight about 10% of silver, about 20% of tin and about 70% of copper, said bonding mixture incorporating about an equal amount by volume of pore-forming material consisting essentially of sodium pyrophosphate.

References Cited by the Examiner

UNITED STATES PATENTS

| 504,388 | 9/93 | Johnston | 51—296 |
| 1,987,861 | 1/35 | Milligan et al. | 51—308 |
| 2,042,635 | 6/36 | Schellens | 51—309 |
| 2,420,859 | 5/47 | Buckner | 51—307 |
| 2,782,110 | 2/57 | Cantrell et al. | 51—308 |
| 2,785,060 | 3/57 | Keeleric | 51—309 |
| 2,937,934 | 5/60 | Nefflen | 51—293 |
| 2,980,524 | 4/61 | Morton | 51—293 |

FOREIGN PATENTS 619,098  3/49  Great Britain.

ALEXANDER H. BRODMERKEL, *Primary Examiner.*

JOHN R. SPECK, MORRIS LIEBMAN, *Examiners.*